(12) United States Patent
Moinzadeh et al.

(10) Patent No.: US 11,076,079 B2
(45) Date of Patent: Jul. 27, 2021

(54) ELECTRONIC MAGNIFIER WITH DEDICATED WIFI AND URL

(71) Applicants: Seyedmansour Moinzadeh, Walnut Creek, CA (US); Seyedeh Rasta Moeinzadeh, Walnut Creek, CA (US); Seyedeh Rosha Moeinzadeh, Walnut Creek, CA (US)

(72) Inventors: Seyedmansour Moinzadeh, Walnut Creek, CA (US); Seyedeh Rasta Moeinzadeh, Walnut Creek, CA (US); Seyedeh Rosha Moeinzadeh, Walnut Creek, CA (US)

(*) Notice: Subject to any disclaimer, the term of this patent is extended or adjusted under 35 U.S.C. 154(b) by 1048 days.

(21) Appl. No.: 15/003,722

(22) Filed: Jan. 21, 2016

(65) Prior Publication Data

US 2016/0212390 A1     Jul. 21, 2016

(30) Foreign Application Priority Data

Jan. 21, 2015 (IR) .................. 139350140003011757

(51) Int. Cl.
*H04N 5/225*     (2006.01)
*H04N 5/262*     (2006.01)

(52) U.S. Cl.
CPC ......... *H04N 5/2256* (2013.01); *H04N 5/2628* (2013.01)

(58) Field of Classification Search
CPC ........................... H04N 5/2256; H04N 5/2628
(Continued)

(56) References Cited

U.S. PATENT DOCUMENTS

2012/0075454 A1   3/2012  Sugiyama
2012/0188345 A1*  7/2012  Salow ................ H04N 21/2743
                                                        348/47
(Continued)

OTHER PUBLICATIONS

Iranian Patent No. 25600 titled "Electronic magnifying device for the visually impaired with the ability to connect to a TV" dated May 27, 1997 by Seid Mansour Moinzadeh. Machine translated Abstract: The electronic magnifying device is powered by 220V AC at 50 Hz, which is generated by using a rectifier transformer and a direct 12V internal power regulator. The image input, after passing through the lens, falls on the CCD model, which is converted into an electrical signal. The electrical signal undergoes the operations of signal correction and amplification, which combined with a set of horizontal and vertical synchronous signals, generates the video signal (composite) that can be input to the video input of the TV to view the image.
(Continued)

*Primary Examiner* — Mikhail Itskovich
(74) *Attorney, Agent, or Firm* — NovoTechIP International PLLC

(57) ABSTRACT

An electronic magnifier is provided. The electronic magnifier includes a camera capturing an image from a document or a picture; an image processing module configured to receive the captured image, magnify the captured image, and generate a composite video output including a magnified image based on the captured image; a USB converter module configured to receive the composite video output of the image processing module and convert the composite output to a USB output; and a WiFi converter module configured to receive the USB output from the USB converter module and convert the USB output to a WiFi output, such that the WiFi output can be received at a device having a display monitor and used by the device to display the magnified image on the display monitor.

14 Claims, 10 Drawing Sheets

(58) Field of Classification Search
USPC .......................................................... 348/63
See application file for complete search history.

(56) References Cited

U.S. PATENT DOCUMENTS

| | | | | |
|---|---|---|---|---|
| 2013/0088582 | A1* | 4/2013 | Moinzadeh | H04N 5/2251 348/77 |
| 2014/0269425 | A1* | 9/2014 | Fisher | H04L 41/0809 370/254 |
| 2014/0347457 | A1 | 11/2014 | Rodriguez et al. | |
| 2014/0355446 | A1* | 12/2014 | Altman | H04W 28/0289 370/235 |

OTHER PUBLICATIONS

Iranian Patent No. 47514 titled "Electronic magnifying device", dated Apr. 27, 2008 by Seid Mansour Moinzadeh. Machine translated Abstract: The electronic magnifying glass is a device for the use of the visually impaired, which allows the text to be read by magnifying the texts and viewing the image through the TV or by using peripheral equipment through the computer monitor.

Iranian Patent No. 49541 titled "Electronic magnifying device with the ability to connect to display glasses" dated Jun. 21, 2008 by Seid Mansour Moinzadeh. Machine translated Abstract: The 8/50 electronic magnifier is a device for the use of the visually impaired, which by magnifying text provides the possibility of reading the text and viewing the image through the display glasses, TV or by using peripheral equipment through a computer monitor.

Iranian Patent No. 67843 titled "Design and manufacture of electronic magnifying device with writing capability" dated Dec. 12, 2010 by Seid Mansour Moinzadeh, et al. Machine translated Abstract: The electronic magnifier is a device for the use of the visually impaired, which by magnifying text allows the text to be read and images viewed from a distance, and allows the possibility of reading simultaneously with writing through the video input of the TV or by using peripheral equipment through the computer monitor.

Iranian Patent No. 67849 titled "Multipurpose electronic magnifying device" dated Dec. 12, 2010 by Seid Mansour Moinzadeh, et al. Machine translated Abstract: Multi-purpose electronic magnifier was designed and built and is a device for use by visually impaired people, surgeons, doctors and dentists, electronic and computer specialists and anyone who pursues a delicate and precise activity.

Iranian Patent No. 70377 titled "Construction of electronic magnifier with direct adjustability for the visually impaired" dated May 4, 2011 by Seid Mansour Moinzadeh, et al. Machine translated Abstract: The electronic magnifier was designed and built and is a device for the use of the visually impaired, which by magnifying the texts provides the possibility of reading the text and viewing the image through the video input of the TV device or using peripheral equipment through the computer monitor.

\* cited by examiner

ELECTRONIC MAGNIFIER WITH DEDICATED WIFI AND URL

CROSS REFERENCE TO RELATED APPLICATION

This application claims the benefit of priority to an Iran patent application having serial number 139350140003011757, filed on Jan. 21, 2015, which subsequently issued as Iran patent number 87390 on Dec. 6, 2015, both of which are incorporated by reference herein in their entireties.

TECHNICAL FIELD

The present application relates generally to electronic text and image magnifiers and, more particularly, to a portable electronic magnifier for providing text and image magnification for visually impaired such that the magnified image can be displayed on a display unit of a computing device using dedicated WiFi connection and URL.

BACKGROUND

People with impaired vision have limitations in reading documents written in small fonts. Magnification of texts and images provide reading possibility for people with such limitations. In recent years, books with large font prints are published for the visually impaired. In addition, visual aid devices using lenses and magnifying glasses have been developed to help people with limited visual capabilities with reading. Moreover, electronic visual aids based on closed-circuit television (CCTV) technology have been developed that enable the visually impaired to view magnified texts on large television screens.

Other solutions for text magnification such as electronic books (e.g. e-books) or soft versions of the documents magnified by word processing tools (e.g., zooming) on a display of a computing device can enable the visually impaired to read documents previously stored on a memory of a computing device.

However, a text magnifying tool is needed for displaying a magnified text of a paper document on a display screen without a need for network connection and with a dedicated WiFi and uniform resource locator (URL) address.

SUMMARY

An electronic magnifier is provided. The electronic magnifier includes a camera capturing an image from a document or a picture; an image processing module configured to receive the captured image, magnify the captured image, and generate a composite video output including a magnified image based on the captured image; a USB converter module configured to receive the composite video output of the image processing module and convert the composite output to a USB output; and a WiFi converter module configured to receive the USB output from the USB converter module and convert the USB output to a WiFi output, such that the WiFi output can be received at a device having a display monitor and used by the device to display the magnified image on the display monitor. The device may include a television, a display monitor, or a computing device. The WiFi converter module includes a dedicated URL associated with the video output, wherein when the device includes the computing device, the dedicated URL provides display of the magnified image via a browser of the computing device.

The electronic magnifier further includes a charging module including a battery for charging the electronic magnifier, wherein the charging module is configured to prevent battery from being overcharged; a set of control buttons, wherein at least one of the plurality of control button is configured to provide an input to the image processing module identifying an image mode for the magnified image; an LED light configured to provide light to the document or the picture; a sliding switch configured to select an output type of the magnified image from the electronic magnifier. The image mode may include a colored image, a magnified black and white image, high contrast black and white image, or a negative high contrast black and white image. The output type selected by the sliding switch may include a composite video output, a USB output, and a WiFi output.

The image processing module may be configured to magnify the image based on one or more input signals provided by a user of the electronic magnifier via one or more buttons on the electronic magnifier. The image processing module may include an image sensor, wherein the image sensor is a CMOS sensor or a CCD sensor.

A method for generating a magnified image by an electronic magnifier is provided. The method includes generating light from a light source towards a document or a picture to be electronically magnified; capturing via a camera an image from the document or the picture based on the light reflected from the document or the picture; magnifying via an amplifier the captured image; generating a composite video signal from the magnified image; converting the composite video signal output to a USB output; converting the USB output to a WiFi output; and providing the composite video signal output, the USB output, and the WiFi output to a device capable of displaying the magnified image. The device may include a television, a display monitor, or a computing device.

Converting the USB output to the WiFi output may include defining a dedicated URL for the video output, wherein when the device is a computing device, the dedicated URL provides display of the magnified image via a browser of the computing device. Converting the USB output to the WiFi output may also include wirelessly sending the WiFi output to the computing device with a 2.4 Gigahertz frequency.

The method may also include receiving one or more input from at least one of a set of control buttons of the electronic magnifier, wherein the one or more input identify an image mode for the magnified image, and wherein the magnifying of the image is based on the image mode. The image mode may include a colored image, a magnified black and white image, high contrast black and white image, and a negative high contrast black and white image.

The method may include receiving an input identifying an output type, from a switch on the electronic magnifier, wherein the output type identifies one of the composite video output, the USB output, and the WiFi output for displaying on the device.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Figure 1:
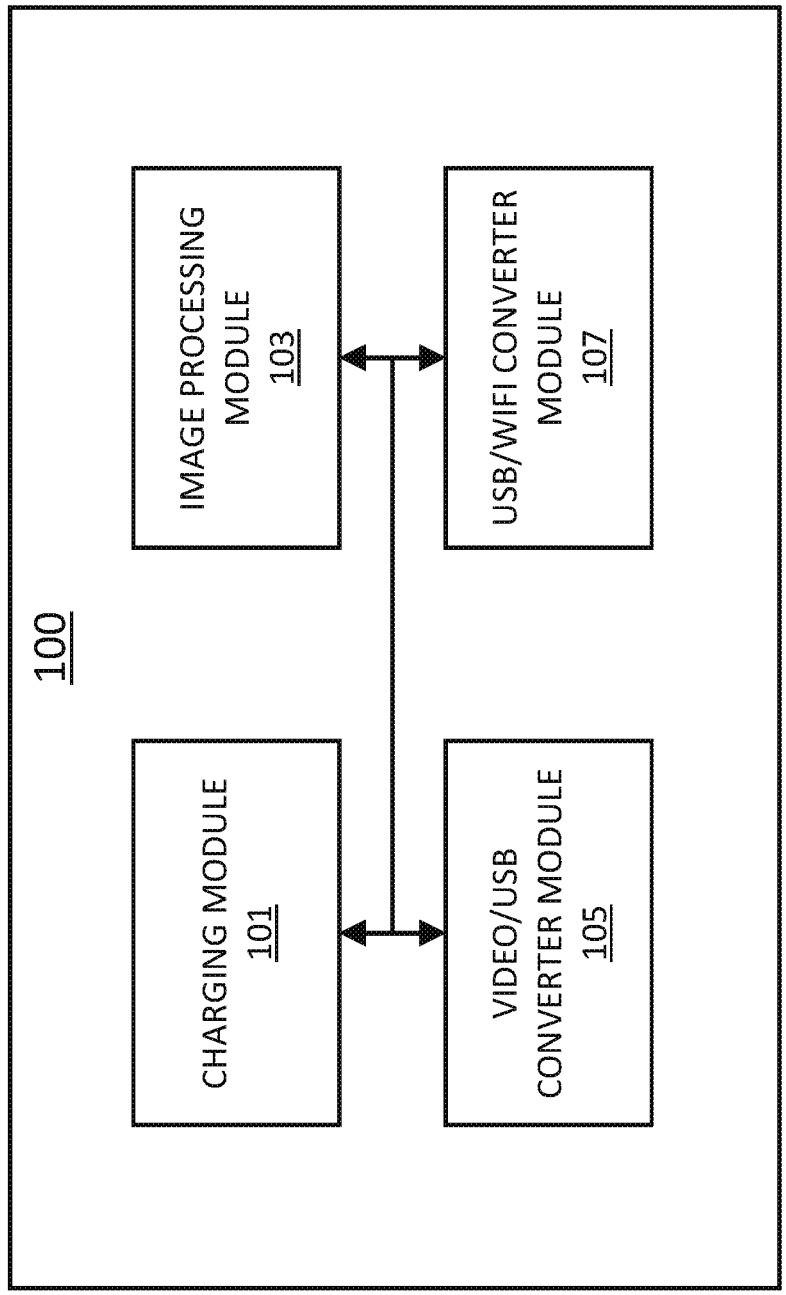
FIG. 1 illustrates a block diagram of components of an electronic magnifier, according to an implementation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The World Health Organization (WHO) defines visual impairment or low vision as a severe reduction in vision that cannot be corrected with standard glasses or contact lenses and reduces a person's ability to function at certain or all tasks. Legal blindness (which is actually a severe visual impairment) refers to a best-corrected central vision of 20/200 or worse in the better eye or a visual acuity of better than 20/200 but with a visual field no greater than 20° (e.g., side vision that is so reduced that it appears as if the person is looking through a tunnel).

WHO defines impaired vision in five categories including low vision 1, which is a best corrected visual acuity of 20/70; low vision 2 starting at 20/200; blindness 3 which is below 20/400; blindness 4 which is worse than 5/300; and blindness 5 which is no light perception at all. According to this definition, the number of blind people in the world is estimated at 39 million while the number of people with low vision is about 246 million.

Various tools and techniques have been developed for helping people with low vision to access information. One of the main problems a visually impaired person faces is the ability to read written documents. Lenses and optical tools provide limited magnification. In high levels of magnification, images can be distorted and difficult to read. In addition, the environmental factor such as light and other ergonomic factors can affect the reading experience of the visually impaired using these tools and lenses. Use of electronic magnifiers can overcome the above mentioned limitations.

On the other hand, recent developments in computing technologies and peripheral devices and use of various gadgets such as tablet computers, mobile devices, etc. provide opportunities for enhancement in tools designed and developed to be used by visually impaired for reading. Reading includes not only books, magazines and other documents, but may also include facilitating procedures such as filling up forms (e.g., at the bank), reading price tags and labels on various items in a store, reading a boarding pass at the airport, and so on.

The disclosed electronic magnifier (Behdid electronic magnifier) can provide an aid for people with low vision by magnifying the provided image, enabling the user to select the magnification degree, modifying the background color or changing the polarity of the provided image. The Behdid electronic magnifier can also be connected to various types of computing devices such as desktops, laptops, tablets, and smart phones.

The Behdid electronic magnifier can provide a dedicated WiFi and URL. Behdid electronic magnifier can also provide video output and USB output without a need for a network connection (e.g., the Internet) or an access point (e.g., a router). Behdid electronic magnifier can be wirelessly connected to a computing device using the dedicated WiFi. Behdid electronic magnifier can be compatible with various operation systems such as, for example, Windows®, iOS®, Android®, etc. Behdid electronic magnifier can also communicate with the computing devices via various browsers such as, for example, Safari®, Firefox®, etc. using a dedicated URL address. Behdid electronic magnifier can be connected to a USB port of a computing device. Behdid electronic magnifier can also be connected to a television or a display monitor.

Reference now is made in detail to the examples illustrated in the accompanying drawings and discussed below. FIG. 1 illustrates a block diagram of components of an electronic magnifier 100, according to an implementation. As shown in FIG. 1, the Behdid electronic magnifier 100 includes an electronic circuit and charging module 101 described in FIG. 2, an image processing module 103 described in FIG. 3, a video to USB converter module 105 described in FIG. 4, and a USB to WiFi converter module 107 described in FIG. 5.

Figure 2:
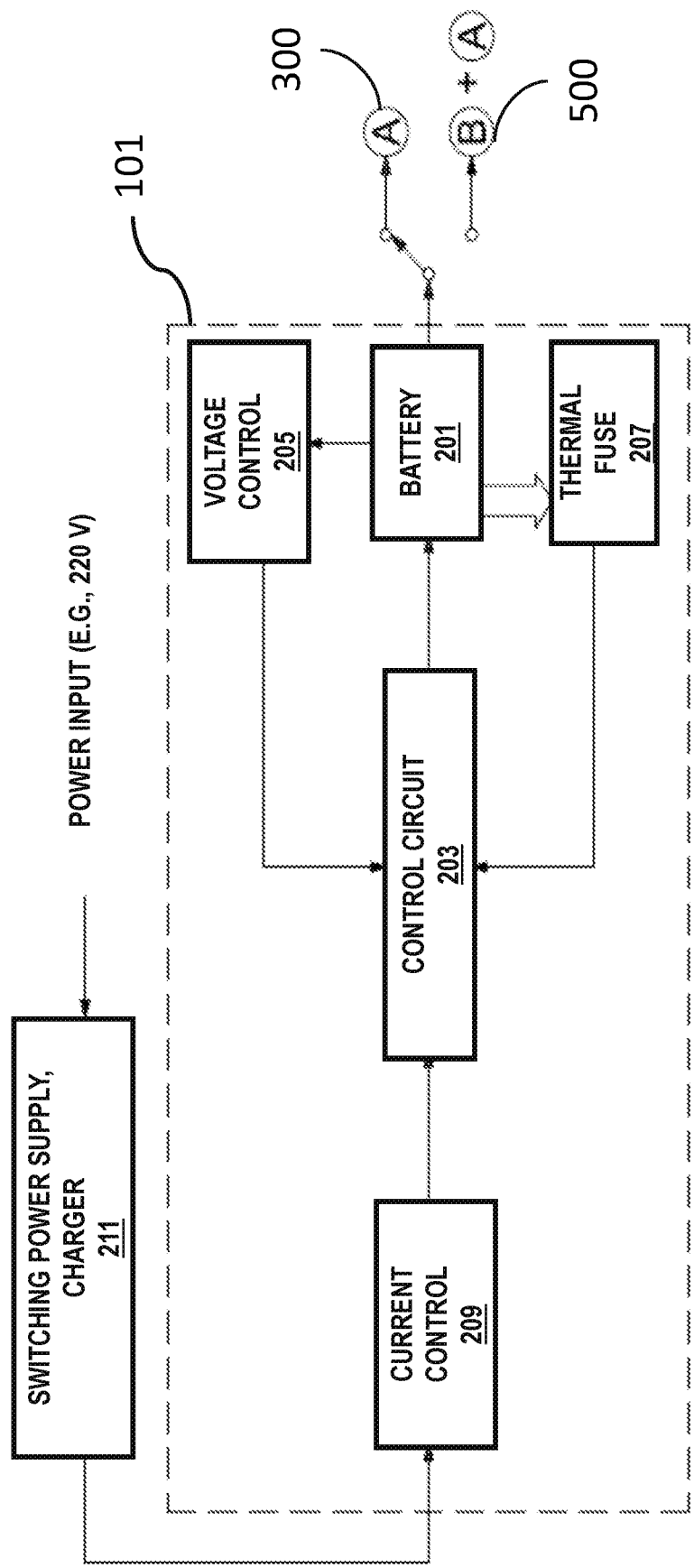
FIG. 2 illustrates a diagram of an electronic circuit and charging module of the electronic magnifier of FIG. 1, according to an implementation.

FIG. 2 illustrates a diagram of the charging module 101 of the Behdid electronic magnifier of FIG. 1, according to an implementation. As shown in FIG. 2, a rechargeable battery 201 can be used as a power source for the Behdid electronic magnifier 100. The battery 201 can, for example, be a lithium ion battery. The control circuit 203 can control the recharging process of battery 201. For example, the control circuit 203 may include a controller 209 for controlling the electric current, a fuse 207 for controlling the heat generated at battery 201, a voltage controller 205 for controlling the voltage at battery 201, for example to prevent overcharging the battery. The charging source can be a switching source 211 connected to the electrical grid. The output of battery 201 can be used as input to feed the image (shown as 300 in FIG. 2 and FIG. 3). The output of battery 201 can also be used as input to feed the USB to WiFi converter module 107 (shown as 500 in FIG. 1 and FIG. 5)

Figure 3:
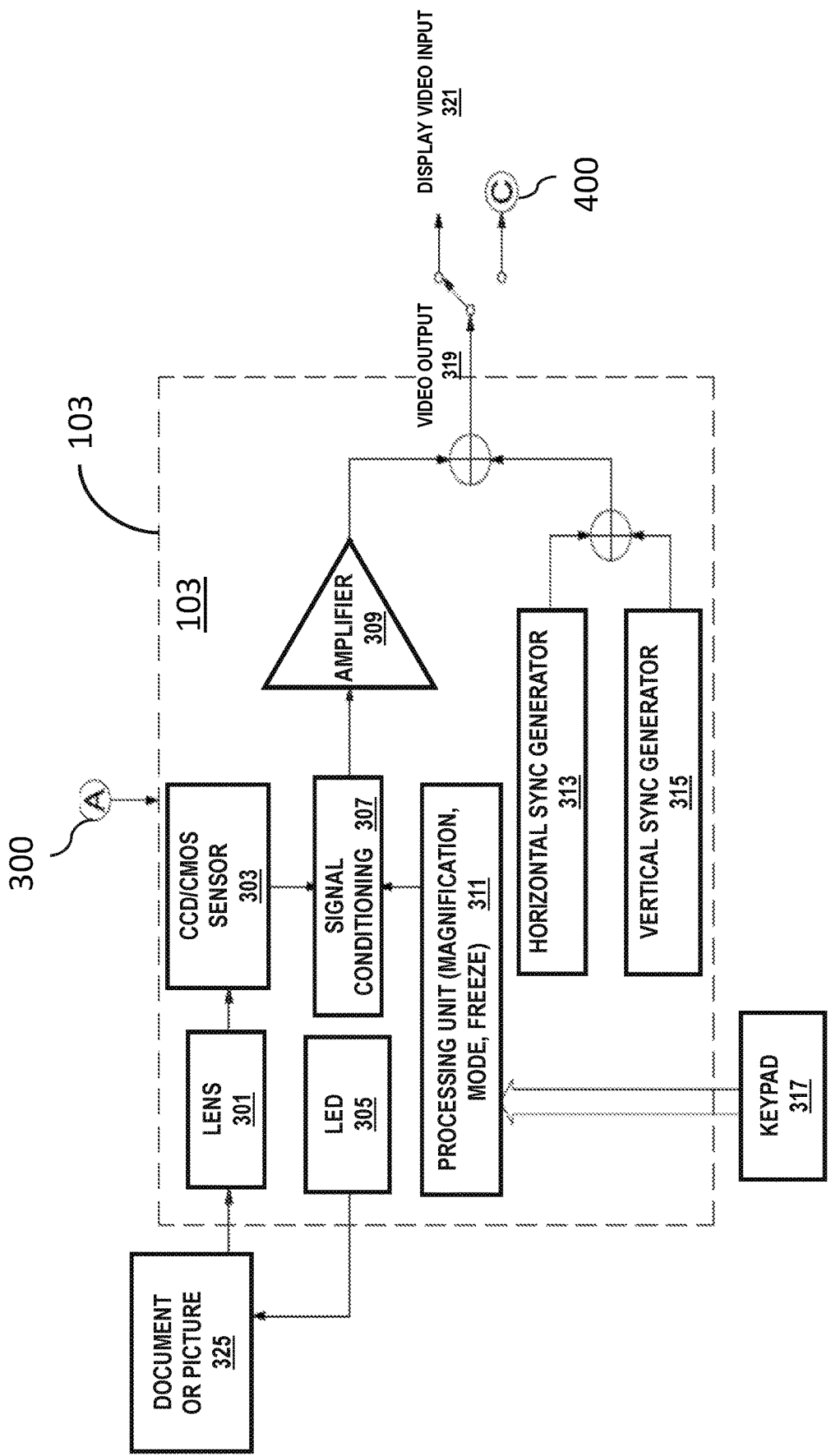
FIG. 3 illustrates a diagram of an image processing module of the electronic magnifier of FIG. 1, according to an implementation.

FIG. 3 illustrates a diagram of an image processing module of the Behdid electronic magnifier of FIG. 1, according to an implementation. The image processing module 103 received an input 300 from battery 201 of FIG. 2. A document or picture 325 is lighted by a light emitting diode 305. An image from the lighted document or picture 325 enters a camera lens 301. Upon exiting the camera lens 301, the light from the document or picture 325 enters a sensor 303 and an image of the document or picture 325 is created at the sensor 303. The sensor 303 can be a complementary metal-oxide semiconductor (CMOS) sensor, or a charged couple device (CCD) sensor. The created image may then be conditioned by the signal conditioning component 307 and prepared for further processing. The created image may then be amplified via an amplifier 309. Such that the power of the image signal is increased. The amplifier 309 may amplify the created image using amplifying signals created by a horizontal signal generator 313 and a vertical signal generator 315.

In some cases an input may be received from an input component 317. The input unit 317 can be a keyboard, a keypad, a touch screen, etc. The input from the input unit 317 can be received at a processor 311, wherein the processor 311 can modify the image, for example, by enlarging the image (e.g., zoom in), changing the image mode (e.g., change the image polarity), freezing the image frame, etc. The modifications by the processor 311 can be applied to the image via the signal conditioning component 307.

The final image output from amplifier 309 which is a video composite signal, can be directly sent to a displaying device 321 to be displayed. Alternatively or additionally, the output 319 can be used as input 400 for the video to USB converter module 105 described in FIG. 4.

Figure 4:
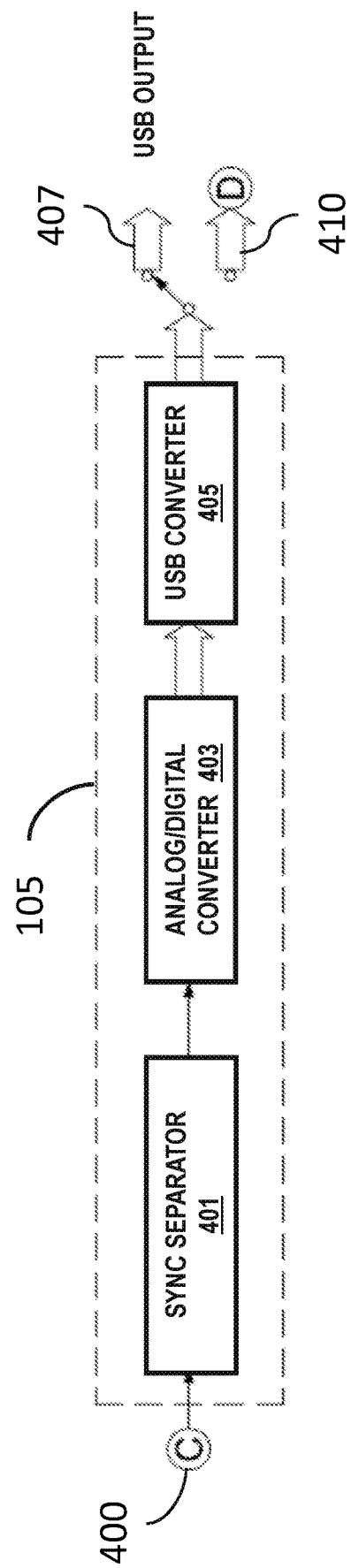
FIG. 4 illustrates a diagram of a video to USB converter module of the electronic magnifier of FIG. 1, according to an implementation.

FIG. 4 illustrates a diagram of a video to USB converter module of the Behdid electronic magnifier of FIG. 1, according to an implementation. The video to USB converter module 105 received an input 400 from the output of the image processing module 103 shown in FIG. 3. The video to USB converter module 105 generates a video signal with USB standard from the input 400. For example, a sync signal separator 401 may be used to separates the composite input signal 400 into separate horizontal and vertical sync signals. In addition, an analog to digital converter 403 can convert the separate signals generated by the sync signal separator 401 into a digital signal. Upon generation of the digital signal, a USB converter 405 can convert the digital signal into a signal according to USB standard. The USB output from the video to USB converter module 105 can be used as input 407 to a USB port of a display device 321 as shown in FIG. 3. Alternately, the USB output from the video to USB converter module 105 can be used as input 410 to the USB to WiFi converter module 107 described in FIG. 5.

Figure 5:
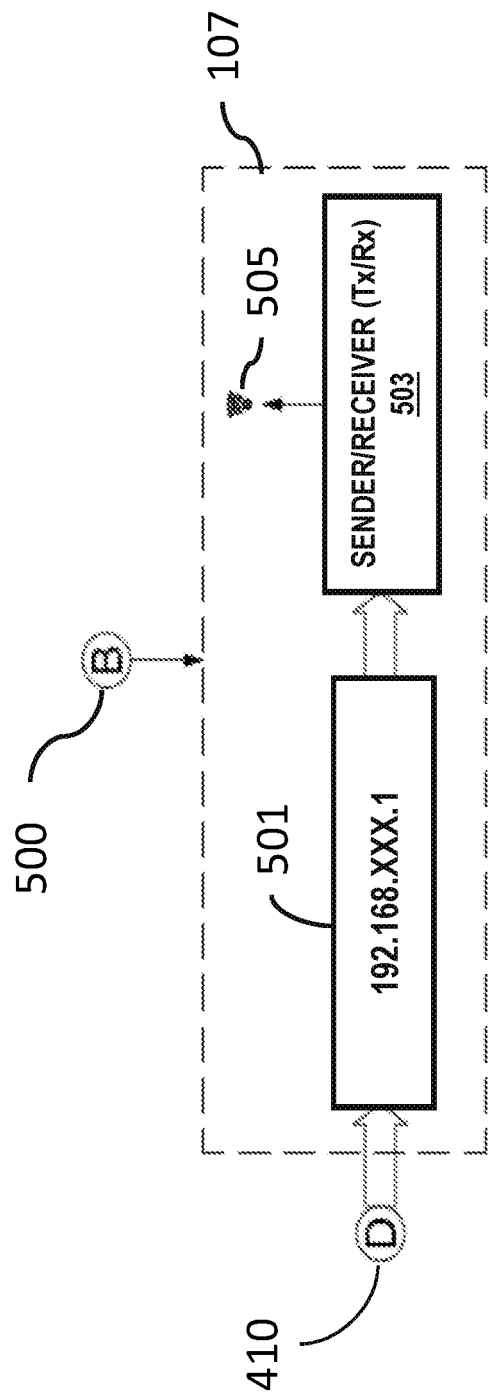
FIG. 5 illustrates a diagram of a USB to WiFi converter module of the electronic magnifier of FIG. 1, according to an implementation.

FIG. 5 illustrates a diagram of a USB to WiFi converter module of the Behdid electronic magnifier of FIG. 1, according to an implementation. The USB to WiFi converter 107 receives a USB input 410 from the video to USB converter module 105. A processor 501 defines a dedicated URL address (e.g., 192.168.xxx.1) for the received input signal 401. The signal can be then sent out as a WiFi signal by a sender/receiver 503 over an antenna 505. The output WiFi signal can be sent over the antenna 505, for example, on a 2.4 Gigahertz frequency bandwidth. The output WiFi signal when received by a computing device can be used to display the image from the document or picture 325 of FIG. 3 on a display monitor of the computing device. The USB to WiFi converter module 107 can receive a power feed 500 produced as output of the charging module 101.

Figure 6A:
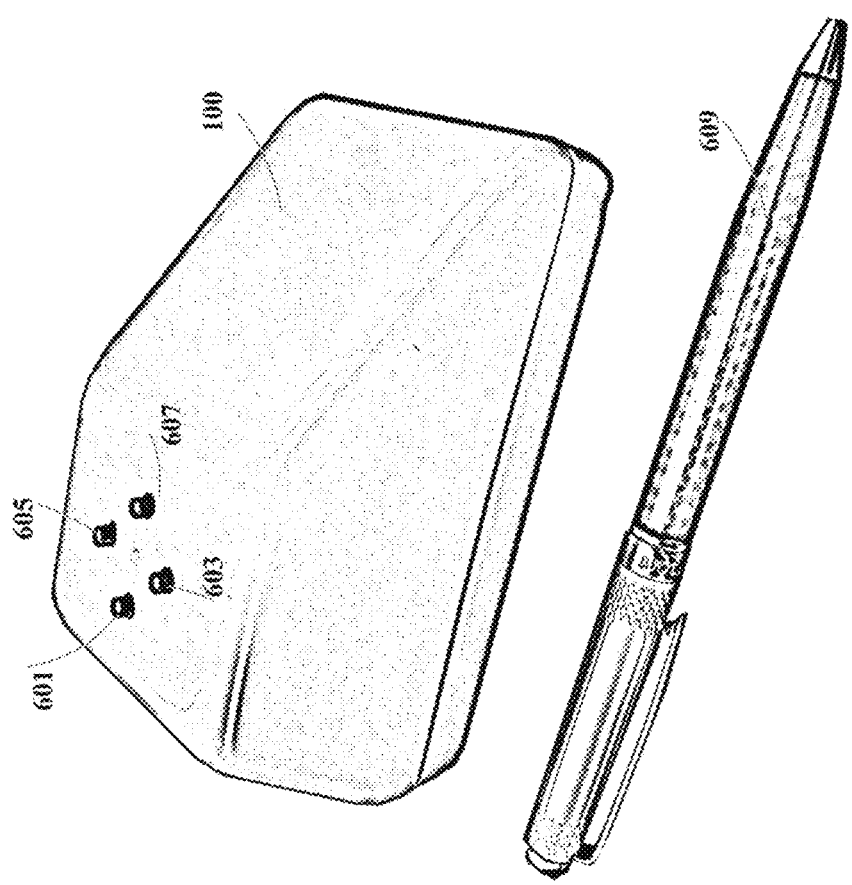
FIGS. 6A-6C illustrate schematic diagrams of the electronic magnifier of FIG. 1, according to an implementation.
Figure 6B:
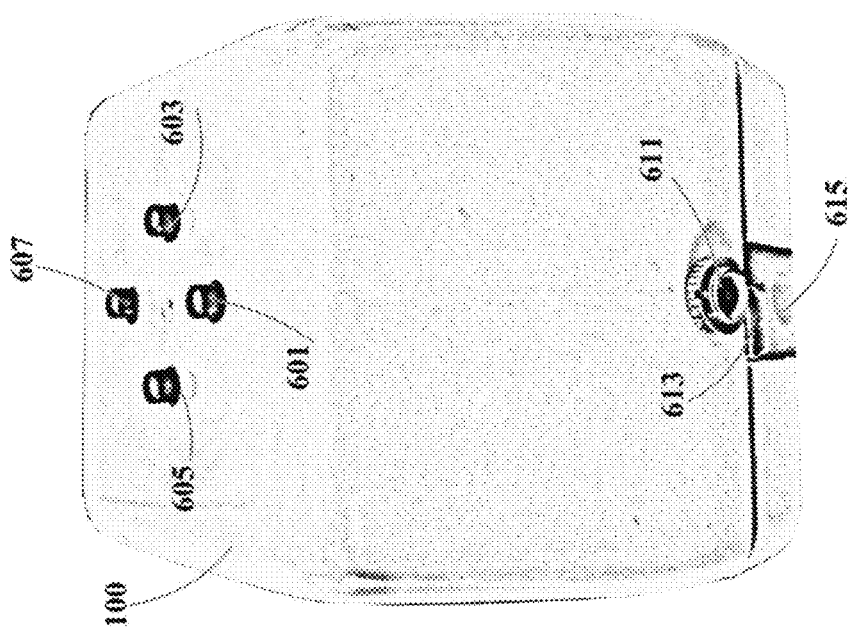
Figure 6C:
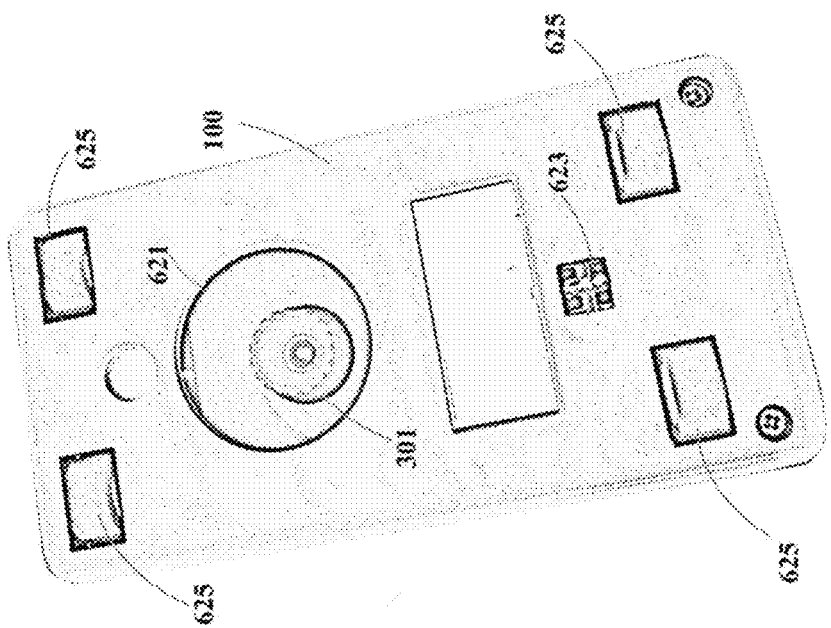

FIGS. 6A-6C illustrate schematic diagrams of the Behdid electronic magnifier of FIG. 1, according to an implementation. FIG. 6A illustrates a top view of the Behdid electronic magnifier 100. The pen 609 is used to show real dimensions of the Behdid electronic magnifier 100 in comparison with an ordinary pen. As shown in FIG. 6A, the Behdid electronic magnifier 100 can have multiple buttons 601, 603, 605, and 607 that enable a user to work with the Behdid electronic magnifier 100. A four button model is shown in FIG. 6A. However, various models of the Behdid electronic magnifier 100 may include more buttons depending on the services provided to the user. As previously described with regards to FIG. 3, the input by the user using a button 601, 603, 605, or 607 can be received at the image processing module 103 as input 317 and applied on the image by the processor 311.

In the example shown in FIG. 6A, button 601 can be used to magnify the image from the document or picture 325. The button 601 can magnify the image in 8 steps while each press of the button 601 causes one step of magnification. The button 607 can be pressed to reduce magnification. The button 605, when pressed, freezes the last magnified image until the button 605 is pressed again to un-freeze the last image. The button 603, when pressed can cause the image to be displayed in different modes as follows. The initial magnified image displayed is a normal colored image and when it is displayed a beeping sound is produced. The first time button 603 is pressed by the user, the image can be converted to black and white and two beeping sounds can be produced. The second time button 603 is pressed, a high contrast negative image of the black and white image is displayed and three beeping sounds are produced. The third time button 603 is pressed, the black and while image can be displayed with high contrast and four beeping sounds are produced. And the fourth time button 603 is pressed, the initial color image is displayed and one beeping sound is produced.

It is noted that the adjustments described above with regards to buttons 601, 603, 605, and 607 can be performed using an on screen display (OSD) service available on televisions and display monitors. For a television, display monitor or computing device having the OSD service, the user may apply adjustments described with regards to buttons 601 to 607 by using the buttons associated with the adjustments on the device to, for example, convert the magnified image to a color image, black and white mage, negative image, etc. or to change the image contrast to high or low.

FIG. 6B illustrates a rear view of the Behdid electronic magnifier 100. As shown in FIG. 6B, the Behdid electronic magnifier 100 can have a video output 611 (e.g., a composite video output). The video output 611 receives the video output from the output 319 of FIG. 3. The video output 611 can be connected to a video input of a display device such as a television or a computing device to display the image of the document or picture 325 on a display of the television or the computing device. The Behdid electronic magnifier 100 can also have a USB output 613 which receives its input from the USB output 407 of FIG. 5. The USB output 613 can be connected as an input feed to a USB input of a television or a computing device to display the image of the document or picture 325 on a display of the television or the computing device. The electronic amplifier 100 may also have a charge input 615. The charge input 615 feeds the charging module 101 of FIG. 2 and is shown in FIG. 2 as the switching source 211.

FIG. 6C illustrates a bottom view of the Behdid electronic magnifier 100. As shown in FIG. 6C, the Behdid electronic magnifier 100 has an imaging cavity 621. The imaging cavity 621 includes the camera lens 301, shown and described in FIG. 3. The Behdid electronic magnifier 100 may also have a sliding selector switch 623. The sliding selector switch 623 can be used by the user for switching between a WiFi output 505 (shown in FIG. 5), video output 319 (shown in FIG. 3), and USB output 407 (shown in FIG.

4). The Behdid electronic magnifier 100 may also may also have a light filter within the imaging cavity 621 to adjust the light produced by light emitting diode (LED) 305 for lighting up the document or picture 325 to produce a clear image. The rotating wheels 625 can guide the movement of the Behdid electronic magnifier 100 over text in a horizontal direction such that the user can keep track of the lines of the text he/she is reading.

The Behdid electronic magnifier 100 as disclosed can be connected to devices such as a television, a display monitor, a computing device or gadget such as a personal computer, a laptop computer, a tablet, a mobile device, etc. The magnified image of a document or picture 325 a user wishes to work with, can be displayed on a display screen of one or more of the devices. The magnified image can be sent to the device for display via a video input, a USB port, a dedicated WiFi communication or a combination. In addition, the magnified image can be displayed on a computing device via a browser using a dedicated URL associated with the Behdid electronic magnifier.

A few use cases of the Behdid electronic magnifier are described herein. In one example, the Behdid electronic magnifier 100 can be connected to the video input of a television or a display monitor such that the magnified image is displayed on the television or the monitor screen. In this example, a connection cable can connect the video output 611 (shown in FIG. 6B) to a video input of the television or the display monitor. Moreover, the sliding switch 623 shown in FIG. 6C can be set on Video output. When the television or the monitor is turned on and, for example, set on Audio/Visual (AV) input setting, the Behdid electronic magnifier 100 is ready for use. The user can move the Behdid electronic magnifier 100 on a document or picture 325 such that a magnified image of the document or picture 325 is displayed on the television or the monitor.

In another example, the Behdid electronic magnifier 100 can be connected to a mobile device, a tablet computer, a laptop or any other computing device via a dedicated WiFi connection. In this example, the user can set the sliding switch 623 on WiFi setting. It may take up to 30 seconds for the WiFi connection to appear in the WiFi connection list of the computing device. The user can then use the setup of the computing device and select "Behdid" from the list to connect Behdid electronic magnifier 100 to the computing device. The Behdid electronic magnifier 100 can be used via a variety of freely available software applications such as, for example, "IP Cam Viewer Lite", "Wi-Fi PCAP Capture", "IP Camera Viewer Basic", to name a few. The software applications can provide remote access and control of an IP camera and capture an image from the document or picture 325. The software application can be selected and downloaded into the computing device depending on the operation system of the computing device. For example, "IP Cam Viewer Lite" and "Wi-Fi PCAP Capture" can work on iOS while "IP Camera Viewer Basic" is an Android application.

Once the software application is opened (e.g., started execution) a new camera device can be defined with the dedicated URL address as, for example, "IP/Host: 192.168.xxx.1". Upon definition of the camera device, when the camera is selected from a list of available devices on the computing device, the image captured from the document or picture 325 by the Behdid electronic magnifier 100 can be displayed on the display monitor of the computing device.

In yet another example, the Behdid electronic magnifier 100 can be used to magnify an image of a document or picture 235 on a browser of the computing device such as, for example, Safari®, FireFox®, etc. In this example, the dedicated URL, for example, "192.168.xxx.1" can be entered in an address box of the browser window and the image of the document or picture 325 will be shown on the screen within the browser window similar to a website.

It is noted that the image of the document or picture 325 can be temporarily or permanently stored on a memory location of the Behdid electronic magnifier 100, on a memory location of the computing device or a combination.

In yet another example, the Behdid electronic magnifier 100 can be connected to a television, display monitor or a computing device by a USB port of the television, display monitor or a computing device. In the example, a USB connection cable can be connected between the USB port of the device and the USB output 611 of the Behdid electronic magnifier 100 shown in FIG. 6B. The sliding switch 623 shown in FIG. 6C can be set on the USB/Video option. The operating system (e.g., Windows) can automatically install the device driver software for the Behdid electronic magnifier 100. Upon the installation, the user can open a video streaming software on the computing device such as, for example, AMCap. When the composite input is set as the video input on the computing device, the image from the document or picture 325 can be seen on the display of the computing device.

The Behdid electronic magnifier 100, as disclosed, can be connected to a device with a video input (e.g., a television or display monitor), to a computing device via a dedicated WiFi, to a computing device via a dedicated URL, to a computing device, television or monitor via a USB port, to the computing device using Video Capture applications, or a combination.

The Behdid electronic magnifier 100, as disclosed, can be adjusted using multiple buttons on the magnifier and can magnify the image with a variable magnification to between 1.2 to 3.6 times the monitor size in inches. For example, on a tablet computer with a 10 inches monitor, the magnification can be between 12 to 36. The Behdid electronic magnifier 100 can provide a positive or a negative image from the document ort picture 325, because some people with low vision find it easier to recognize negative image texts and pictures. The Behdid electronic magnifier 100 can display the magnified image in multiple modes. The Behdid electronic magnifier 100 can freeze the image. The provided image can be independent from the amount of light in the environment.

The Behdid electronic magnifier 100 can guide the movement over text in a horizontal direction such that the user can keep track of the lines of the text he/she is reading. The Behdid electronic magnifier 100 is small, lightweight and portable and can produce black and white as well as color images from the document or picture 325.

The Behdid electronic magnifier 100 can be used, not only by people with low vision but also for various projects that need image magnification such as, for example, archeology, arts, study of fabric or paper textures, painting, graphic design, etc. The Behdid electronic magnifier 100 can also be used for medical purposes such as, for example, studying and examining skin or hair. In engineering, the Behdid electronic magnifier 100 can be used for studying circuit boards, etc.

The structure, programming and operations of the various types of mobile devices are well known. However, for completeness, it may be useful to consider the functional elements/aspects of two exemplary mobile devices, at a high-level.

Figure 7:
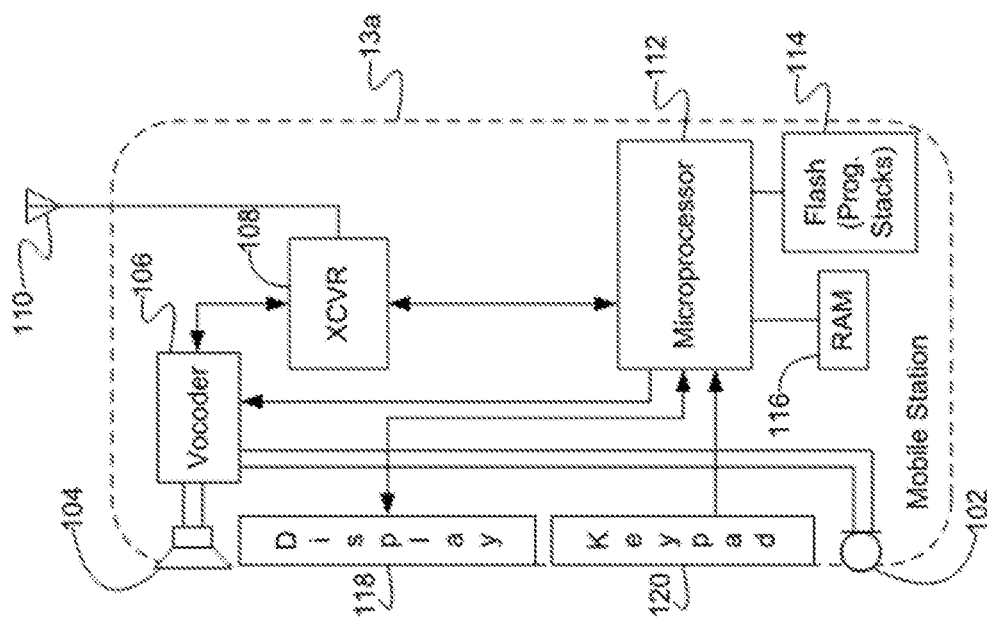
FIG. 7 is a high-level functional block diagram of an exemplary non-touch type mobile device that may utilize the electronic magnification of documents and pictures.

For purposes of such a discussion, FIG. 7 is a high-level functional block diagram of an exemplary non-touch type mobile device that may be used for electronic magnification. Although the mobile device may be a smart-phone or may be incorporated into another device, such as a personal digital assistant (PDA) or the like, for discussion purposes, the illustration shows the mobile device is in the form of a handset. The handset implementation of the mobile device functions as a normal digital wireless telephone station. For that function, the station includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset also includes at least one digital transceiver (XCVR) 108. Today, the handset would be configured for digital wireless communications using one or more of the common network technology types. The concepts discussed here encompass implementations of the mobile device utilizing any digital transceivers that conform to current or future developed digital wireless communication standards. The mobile device may also be capable of analog operation via a legacy network technology.

The transceiver 108 provides two-way wireless communication of information, such as vocoded speech samples and/or digital information, in accordance with the technology of a communication network (not shown). The transceiver 108 also sends and receives a variety of signaling messages in support of the various voice and data services provided via the mobile device and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device includes a display 118 for displaying messages, menus, images, or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course, other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the process for electronic magnification of documents or pictures.

A microprocessor 112 serves as a programmable controller for the mobile device, in that it controls all operations of the mobile device in accord with programming that it executes, for all normal operations, and for operations involved in the electronic magnification of documents and pictures under consideration here. In the example, the mobile device includes flash type program memory 114, for storage of various "software" or "firmware" program routines and mobile configuration settings, such as mobile directory number (MDN) and/or mobile identification number (MIN), etc. The mobile device may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

Figure 8:
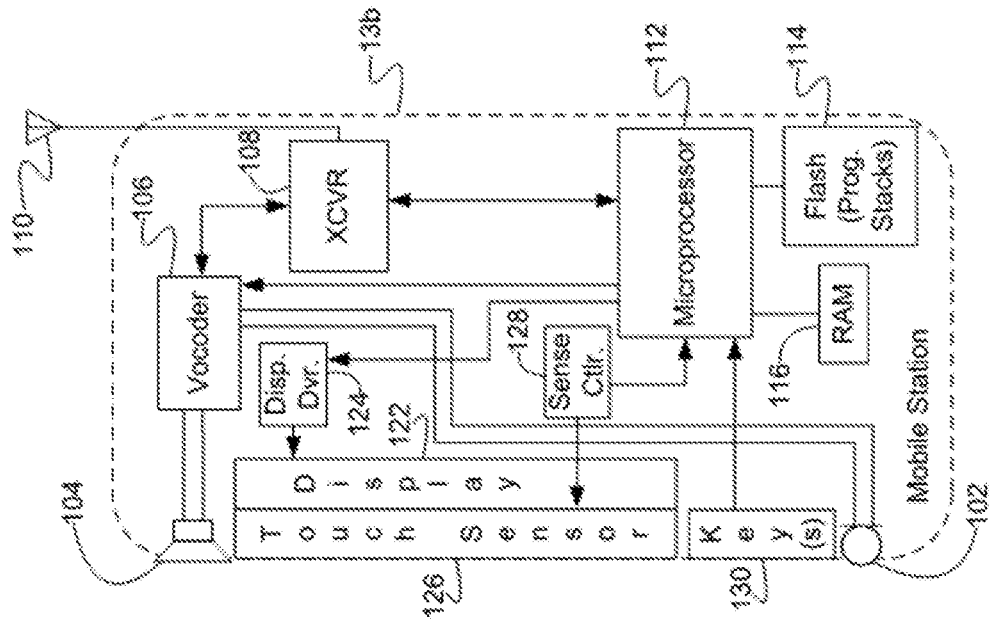
FIG. 8 is a high-level functional block diagram of an exemplary touch screen type mobile device that may utilize the electronic magnification of documents and pictures.

For purposes of such a discussion, FIG. 8 is a high-level functional block diagram of an exemplary touch screen type mobile device that may utilize the electronic magnification of documents and pictures. Although possible configured somewhat differently, at least logically, a number of the elements of the exemplary touch screen type mobile devices are similar to the elements of the mobile device of FIG. 7, and are identified by like reference numbers in FIG. 8. For example, the touch screen type mobile device includes a microphone 102, speaker 104 and vocoder 106, for audio input and output functions, much like in the earlier example. The mobile devices also include at least one digital transceiver (XCVR) 108, for digital wireless communications, although the handset may include an additional digital or analog transceiver. The concepts discussed here encompass implementations of the mobile devices utilizing any digital transceivers that conform to current or future developed digital wireless communication standards. As in the mobile device of FIG. 7, the transceiver 108 provides two-way wireless communication of information, such as vocoded speech samples and/or digital information, in accordance with the technology of a communication network (not shown). The transceiver 108 also sends and receives a variety of signaling messages in support of the various voice and data services provided via the mobile devices and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of FIG. 7, a microprocessor 112 serves as a programmable controller for the mobile devices, in that it controls all operations of the mobile devices in accord with programming that it executes, for all normal operations, and for operations involved in the electronic magnification of documents and pictures under consideration here. In the example, the mobile device includes flash type program memory 114, for storage of various program routines and mobile configuration settings. The mobile device may also include a non-volatile random access memory (RAM) 116 for a working data processing memory. Of course, other storage devices or configurations may be added to or substituted for those in the example. Hence, outlined above, the mobile device includes a processor, and programming stored in the flash memory 114 configures the processor so that the mobile device is capable of using the electronic magnification features discussed.

In the example of FIG. 7, the user interface elements included a display and a keypad. The mobile devices may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary mobile device includes a display 122, which the microprocessor 112 controls via a display driver 124, to present visible outputs to the device user. The mobile devices also include a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile devices. The microphone 102 and speaker 104 may be used as additional user interface elements, for audio input and output, including with respect to some functions related to the electronic magnification of images.

The structure and operation of the mobile devices, as outlined above, were described by way of example, only. As shown by the above discussion, functions relating to the electronic magnification of documents and pictures, via a graphical user interface of a mobile device may be implemented on computers connected for data communication via the components of a packet data network. Although special purpose devices may be used, such devices also may be implemented using one or more hardware platforms intended to represent a general class of data processing device commonly used to run programming so as to implement the electronic magnification of documents and pictures functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for electronic magnification of documents and pictures. The software code is executable by the general-purpose computer that functions as the gateway for electronic magnification of documents and pictures and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for electronic magnification of documents and pictures, in essentially the manner performed in the implementations discussed and illustrated herein.

Figure 9:
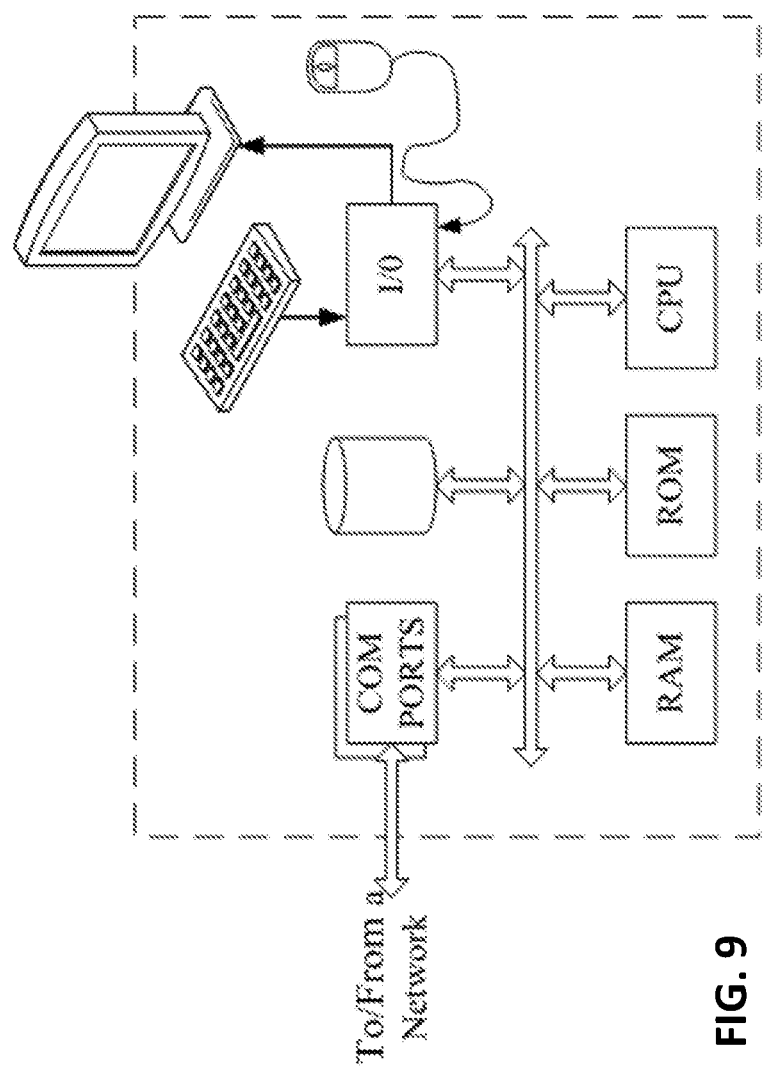
FIG. 9 is a simplified functional block diagram of an exemplary personal computer or customer device that may utilize the electronic magnification of documents and pictures.

FIG. 9 provides a functional block diagram illustration of a general purpose computer hardware platform used for electronic magnification of documents and pictures. FIG. 9 depicts a computing device with user interface elements, as may be used to implement a personal computer or other type of work station or terminal device. The structure, programming and general operation of such computer equipment are well known and as a result the drawings should be self-explanatory.

A computing device, for example, includes a data communication interface for packet data communication. The computing device also includes a central processing unit (CPU), in the form of one or more processors, for executing program instructions. The computing device platform typically includes an internal communication bus, program storage and data storage for various data files to be processed and/or communicated by the computing device, although the computing device often receives programming and data via network communications. The hardware elements, operating systems and programming languages of such computing devices are conventional in nature. Of course, the computing device functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing electronic magnification of documents and pictures outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement electronic magnification of documents and pictures, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic magnifier comprising:
    a camera capturing an image from a document or a picture;
    an image processing module for receiving the captured image, the image processing module including a processor for receiving at least one input from a user and modifying the captured image based on the at least one input via a signal conditioning component, the image processing module also including an amplifier for amplifying the modified image and generating a composite video output including a magnified image based on the captured image;

a USB converter module for receiving the composite video output, the USB converter module including an analog to digital converter for converting the received composite video output into a digital signal and a USB converter for converting the digital signal to a USB output; and a WiFi converter module for receiving the USB output from the USB converter module, the WiFi converter module including a transceiver for receiving the USB output and sending the USB output as a WiFi output to a device having a display monitor for displaying the magnified image wherein the amplifier amplifies the modified image by increasing a power of the modified image.

2. The electronic magnifier of claim 1, wherein the device includes a television, a display monitor, or a computing device.

3. The electronic magnifier of claim 2, wherein the device includes the computing device and the WiFi converter module includes:
 a dedicated URL associated with the USB output, wherein the dedicated URL provides display of the magnified image via a browser of the computing device.

4. The electronic magnifier of claim 1, further comprising:
 a charging module including a battery for charging the electronic magnifier, wherein the charging module is configured to prevent battery from being overcharged;
 a plurality of control buttons, wherein at least one of the plurality of control button is configured to provide an input to the image processing module identifying an image mode for the magnified image;
 an LED light configured to provide light to the document or the picture; and
 a sliding switch configured to select an output type of the magnified image from the electronic magnifier.

5. The electronic magnifier of claim 4, wherein the image mode includes a colored image, a magnified black and white image, high contrast black and white image, or a negative high contrast black and white image.

6. The electronic magnifier of claim 4, wherein the output type selected by the sliding switch includes a composite video output, a USB output, and a WiFi output.

7. The electronic magnifier of claim 1, the at least one input is provided by the user via one or more buttons on the electronic magnifier.

8. The electronic magnifier of claim 1, wherein the image processing module includes an image sensor, and wherein the image sensor is a CMOS sensor or a CCD sensor.

9. A method for generating a magnified image by an electronic magnifier, the method comprising:
 generating light from a light source towards a document or a picture to be electronically magnified;
 capturing via a camera an image from the document or the picture based on the light reflected from the document or the picture;
 receiving at least one input from a user;
 modifying the captured image via a signal conditioning component based on the at least one input;
 amplifying via an amplifier the modified image to increase a power of the modified image;
 generating a composite video signal from the amplified image;
 converting the composite video signal output to a USB output via a USB converter module, the USB converter module converting the composite video output into a digital signal via an analog to digital converter and converting the digital signal to the USB output via a USB converter;
 converting the USB output to a WiFi output via a WiFi converter module, the WiFi converter module receiving the USB output from the USB converter module and sending the USB output as a WiFi output via an antenna; and
 providing the WiFi output to a device capable of displaying the magnified image.

10. The method of claim 9, wherein the device includes a television, a display monitor, or a computing device.

11. The method of claim 10, wherein the device includes the computing device and converting the USB output to the WiFi output includes:
 defining a dedicated URL for the video output, wherein the dedicated URL provides display of the magnified image via a browser of the computing device; and
 wirelessly sending the WiFi output to the computing device with a 2.4 Gigahertz frequency.

12. The method of claim 9, further comprising:
 receiving one or more inputs from at least one of a plurality of control buttons of the electronic magnifier, wherein the one or more inputs identify an image mode for the magnified image, and wherein the magnifying of the image is based on the image mode.

13. The method of claim 12, wherein the image mode includes a colored image, a magnified black and white image, high contrast black and white image, or a negative high contrast black and white image.

14. The method of claim 9, further comprising:
 receiving an input identifying an output type, from a switch on the electronic magnifier, wherein the output type identifies one of the composite video output, the USB output, and the WiFi output for displaying on the device.

* * * * *